Patented Oct. 2, 1934

1,975,476

UNITED STATES PATENT OFFICE

1,975,476

PRODUCTION OF ORGANIC COMPOUNDS BY DEHYDROGENATION

Mathias Pier, Heidelberg, and Ernst Donath, Mannheim, Germany, assignors to I. G. Farbenindustrie Aktiengesellschaft, Frankfort-on-the-Main, Germany No Drawing. Application December 24, 1929, Serial No. 416,302. In Germany January 19, 1929

4 Claims. (Cl. 260—168)

This invention relates to improvements in the manufacture and production of organic compounds by dehydrogenation.

It has already been proposed to employ sulphides, preferably the sulphides of the heavy metals, either as such or in mixtures, as catalysts in the manufacture and production of organic compounds by dehydrogenation. Moreover, other metalloid compounds, namely phosphides, selenides, arsenides, antimonides and bismuthides have also been proposed as catalysts for the dehydrogenation.

We have now found that valuable organic compounds are obtained by dehydrogenation when different substances selected from the group consisting of cobalt or iron or metals of groups 5 to 7 of the periodic system or compounds of these metals, in particular oxides, in admixture with one another or with other additional substances are employed as catalysts after a special pretreatment at temperatures above 200° C. with gases or vapors comprising compounds, and in particular hydrogen compounds, of the metalloids, which are solid at room temperature of groups 5 and 6 of the periodic system, if desired together with hydrogen. Substances, which form hydrogen compounds of the said metalloids as such or with hydrogen, are also very suitable for the said treatment. The catalysts thus obtained are eminently suitable for example for the dehydrogenation of hydrocarbons, such as mineral oils, benzines and naphthenes as well as of products of the destructive hydrogenation of distillable carbonaceous materials, such as coals of all varieties, tars, mineral oils and the like, in particular, for example, for the manufacture of non-knocking gasolines. As metals of groups 5 to 7 of the periodic system, vanadium, molybdenum, tungsten, niobium, tantalum, chromium and manganese and oxides of the same have been found to be suitable. It is preferable to employ mixtures of these elements from different groups of the periodic system.

As additional substances, which increase the catalytic activity, lead, tin, zinc, cadmium or their compounds, or solid oxides of the metalloids of the 5th group of the periodic system or the corresponding acids or their salts are particularly suitable.

As metalloid compounds for pretreating the catalysts may be mentioned for example hydrogen sulphide, hydrogen selenide, hydrogen phosphide, carbon disulphide, hydrogen iodide and the like. It is especially advantageous to employ the catalysts on carriers, such as active carbon, or silica.

As specific examples of catalysts suitable for application and for pretreatment in the process according to the present invention may be mentioned those prepared from oxides or nitrates of cobalt, iron, chromium, molybdenum, tungsten, uranium or vanadium together with phosphorus pentoxide or antimony pentoxide or, except in cases where the other constituent contains cobalt, cobalt oxide. Further specific mixtures are molybdenum trioxide, cobalt oxide and phosphorus pentoxide, or molybdenum trioxide, lead oxide and phosphorus pentoxide, or molybdenum trioxide, zinc oxide and phosphorus pentoxide. In the above mentioned mixture arsenious acid or antimony trioxide or vanadium pentoxide may be employed in place of antimony pentoxide. The said catalysts may be employed to great advantage deposited on carriers, such as active charcoal or silica. The last named constituent of each of the specific catalyst mixtures may, if desired, be employed in small amounts, as for example in amounts of up to about 10 per cent.

The dehydrogenation is preferably carried out in the gas phase with the addition, if desired of gases which participate in the reaction, or which merely act as heat carriers or serve for maintaining a partial pressure favorable to the reaction. As such additional gases may be mentioned, for example, nitrogen, carbon dioxide, water vapor and the like. If desired, the process may be carried out in a cycle.

Generally speaking temperatures above 200°, preferably above 300° C. are maintained. Undesirable splitting may be avoided by appropriate regulation of the temperature and of the period of time during which the product is in the reaction chamber. The process may be carried out under increased, ordinary or reduced pressures.

The process may be advantageously combined with the distillation of substances containing benzine, for example by leading the constituents of the same, which during the distillation boil above 80° C. over the said catalysts in the form of vapor.

The following examples will further illustrate the nature of this invention, but the invention is not restricted to these examples.

Example 1

Active charcoal which is impregnated with ammonium molybdate, lead nitrate and phosphoric acid is pretreated for a period of 6 hours with hydrogen selenide at a temperature of 300° C. If cyclohexane vapor be led over the catalyst under ordinary pressure and at about 480° C. a product is obtained by condensation which contains from 40 to 45 per cent of benzene besides unchanged cyclohexane and a gas is obtained which consists of hydrogen to the extent of about 95 per cent.

*Example 2*

A mixture of ammonium tungstate, cobalt nitrate and antimonic acid is applied to active charcoal. The catalyst is treated with hydrogen sulphide for 4 hours at about 350° C. The vapor of the fraction boiling above 80° C. formed in the distillation of a benzine rich in naphthenes is then led over the catalyst at from 430° to 450° C. at ordinary pressure. The content of aromatic hydrocarbons is thus increased by about 30 percent and more. The gas formed contains about 95 per cent of hydrogen.

*Example 3*

A mixture of ammonium vanadate, cobalt nitrate and phosphoric acid is applied to active charcoal. The catalyst is treated with hydrogen and carbon disulphide for 6 hours at about 350° C. The vapor of the fraction boiling above 80° C. obtained by the distillation of a benzine rich in naphthenes is then led over the catalyst at from 430° to 450° C. and at ordinary pressure. The content of aromatic hydrocarbons is thus increased by about 30 per cent and more. The gas formed contains about 95 per cent of hydrogen.

*Example 4*

If cyclohexane vapors be passed under atmospheric pressure at a temperature of about 430° C. over a catalyst prepared from uranium oxide and cobalt oxide, a reaction product is obtained containing 12 per cent of benzene. If, however, the abovementioned catalyst is pretreated for 6 hours at about 350° C. with a mixture of hydrogen and carbon disulphide vapors and is then employed in the abovementioned reaction, a product is obtained containing 30 per cent of benzene.

*Example 5*

A mixture of ammonium molybdate, cobalt nitrate and phosphoric acid is applied to active charcoal. The said catalyst is then treated for 10 hours at 370° C. with a mixture of hydrogen and carbon disulphide vapors. Vapors of pentane are passed over the catalyst thus obtained at a temperature of about 480° C. A reaction product is thus obtained containing 20 per cent of pentene besides unchanged pentane. After separating off the pentene from the reaction product the remaining pentane is returned to the catalyst.

What we claim is:

1. A process for the dehydrogenation of benzine which comprises applying a mixture of ammonium vanadate, cobalt nitrate and phosphoric acid to active charcoal, treating the catalyst thus obtained for six hours with hydrogen and carbon disulphide at about 350° C., and passing the vapor of the fraction boiling above 80° C. obtained by the distillation of benzine over the said catalyst at from about 430° to 450° C.

2. A process for the dehydrogenation of pentane, which comprises applying a mixture of ammonium molybdate, cobalt nitrate and phosphoric acid to active charcoal, treating the catalyst thus obtained for 10 hours with hydrogen and carbon disulphide vapour at about 370° C., and passing the vapour of pentane over the said catalyst at about 480° C.

3. In the dehydrogenation of benzine in the presence of a mixed catalyst comprising essentially molybdenum trioxide, cobalt oxide and phosphorus pentoxide, the step of subjecting the said catalyst to a special pretreatment at a temperature above 200° C. with a gas comprising essentially a compound of a solid metalloid selected from groups 5 and 6 of the periodic system.

4. In the dehydrogenation of organic compounds in the presence of a mixed catalyst comprising essentially at least one metal of groups 5 to 7 of the periodic system and at least one material selected from the group consisting of solid oxides of the metalloids of the fifth group of the periodic system and the corresponding salts and acids of these metalloids and of substances comprising essentially a metal selected from the class consisting of cobalt, lead, tin, zinc and cadmium, the step of subjecting said catalyst to a special pretreatment at a temperature above 200° C. with a gas comprising essentially a compound of a solid metalloid selected from groups 5 and 6 of the periodic system.

MATHIAS PIER.
ERNST DONATH.